United States Patent [19]

Ching, Jr. et al.

[11] Patent Number: 5,599,641
[45] Date of Patent: Feb. 4, 1997

[54] BATTERY TERMINAL AND CASE STRUCTURE

[75] Inventors: Larry K. W. Ching, Jr., Littleton; Neil H. Puester, Aurora, both of Colo.

[73] Assignee: Gylling Optima Batteries AB, Stockholmsvagen, Switzerland

[21] Appl. No.: 230,969

[22] Filed: Apr. 20, 1994

[51] Int. Cl.[6] .................................................. H01M 2/30
[52] U.S. Cl. ........................... 429/179; 429/180; 429/181
[58] Field of Search ................................... 429/178, 179, 429/180, 181

[56] References Cited

U.S. PATENT DOCUMENTS

| | | |
|---|---|---|
| 689,450 | 12/1901 | Amwake . |
| 1,193,358 | 8/1916 | Carpenter . |
| 1,303,311 | 5/1919 | Hazelett . |
| 1,306,679 | 6/1919 | Ahlgren . |
| 1,532,263 | 4/1925 | Reiser . |
| 1,982,801 | 12/1934 | Gerking .................. 429/178 X |
| 1,983,611 | 12/1934 | Jackson . |
| 2,035,995 | 3/1936 | Sturges ..................... 429/179 X |
| 2,100,921 | 11/1937 | Rolph . |
| 2,480,964 | 9/1949 | Randall . |
| 3,554,813 | 1/1971 | Feldhake . |
| 3,704,173 | 11/1972 | McClelland . |
| 3,849,203 | 11/1974 | Hollis et al. . |
| 3,964,934 | 6/1976 | Ching, Jr. et al. . |
| 4,006,282 | 2/1977 | Antoine et al. . |
| 4,075,368 | 2/1978 | Salamon et al. . |
| 4,233,373 | 11/1980 | Meyler-Warlow et al. . |
| 4,385,100 | 5/1983 | Hook et al. . |
| 4,448,863 | 5/1984 | Terrell ..................... 429/180 X |
| 4,522,899 | 6/1985 | Illmann et al. . |
| 4,522,900 | 6/1985 | Mejia . |
| 4,523,068 | 6/1985 | Lund et al. . |
| 4,684,580 | 8/1987 | Cramer . |
| 4,780,379 | 10/1988 | Puester . |
| 4,859,547 | 8/1989 | Adams et al. . |
| 5,091,273 | 2/1992 | Hug et al. . |

FOREIGN PATENT DOCUMENTS

| | | |
|---|---|---|
| 0140581 | 5/1985 | European Pat. Off. . |
| 641933 | 3/1927 | France . |
| 1379293 | 1/1975 | United Kingdom . |

Primary Examiner—John S. Maples
Attorney, Agent, or Firm—Klaas, Law, O'Meara & Malkin, P.C.

[57] ABSTRACT

A terminal connector assembly provided for conducting electrical current from an electrolytic device through the wall of a case containing the device for preventing leakage of electrolyte from the case. The terminal connector includes a terminal insert mounted within the case wall. The insert contains a first end portion projecting through the wall forming an exterior connection member. A second end portion is laterally spaced from the first end portion and forms an interior connection member remote from the exterior connection member. A mechanism is provided for substantially reducing the transmittal of mechanical loads from the first end potion to the second end portion. A member is provided for electrically interconnecting the interior connection member with the electrolytic device within the case. Finally, a mechanism seals the connection between the electrically interconnecting member and the interior connection member to prevent leakage of electrolyte from the device.

34 Claims, 4 Drawing Sheets

BATTERY TERMINAL AND CASE STRUCTURE

BACKGROUND OF THE INVENTION

1. Field of the Invention

The present invention relates generally to electrochemical devices and, more particularly, to terminal connector assemblies for a device such as a battery. Specifically, the present invention relates to improved terminal assemblies for electrochemical devices, such as batteries, which assembly structures reduce the transmission of mechanical loads to the sealing mechanism thereof. In addition, the present invention further relates to electrochemical cell casing structures adapted to contain such improved terminal assemblies as well as to provide substantial gripping handles for the battery.

2. Description of the Prior Art

A major concern in the manufacture and use of sealed electrochemical devices, such as batteries, is that of leakage of electrolyte and/or gas from the battery container. Under normal conditions, such leakage generally occurs at the site where a battery terminal exits the battery container or casing thus providing a path for leakage. Optimally, a battery terminal should be capable of complete sealing against leakage of electrolyte and/or gases contained within the battery during the lifetime of the battery.

Numerous approaches to resolving this problem have been developed in the past. Such past approaches have included the use of elastic bushings, grommets, press-fit ferrule structures, and the like. A particularly successful battery terminal arrangement is disclosed in U.S. Pat. No. 4,859,547, the contents of which are hereby incorporated herein by reference. This particular arrangement includes a battery terminal post which passes through an opening in a resilient casing, and a pair of ferrules or bushings inserted about the terminal post and press-fit into the opening within the casing wall. In this manner, a much more efficient seal is effected between the terminal post and the plastic casing at the terminal interface without failure due to electrolyte or gas seepage.

Nonetheless, battery terminal structures utilized in existing starved electrolyte recombination batteries do not generally provide adequate gas and electrolyte sealing for a long-life, sealed cell, especially where the terminals are subjected to vibrational stresses. Typically, the battery as designed does provide adequate sealing. However, when mechanical loads, such as torques and pullouts, are applied to the exterior terminal connectors, such mechanical loads are transmitted to the sealing area and tend to loosen the seal. When a seal fails, the life of the battery is diminished through the loss of electrolyte and the ingress of oxygen, as well as through the corrosion of the battery terminal post and the connectors.

In another battery terminal design as taught in U.S. Pat. No. 3,704,173, the seal used in a sealed recombination cell has a terminal seal which prevents the leakage of gas and electrolyte between the lead and plastic parts. This seal depends on an expanding body, that is a rivet, to create and maintain the seal. The external terminal connector of the cell is of a different material from the lead post and also depends on intimate contact between the rivet and the post to obtain a path through which current can flow. An alternate design for the terminals, as disclosed in U.S. Pat. No. 3,964,934, includes the use of a threaded stud which is cast into the post during the post manufacturing. This design depends on the drawing of the stud into the plastic post cavity via a nut to obtain its seal. Both of these designs require non-lead parts to create the electrolyte and gas seal. Additionally, should a corrosion occur between the lead post and the expansion body, that is the rivet or the stud, the electrical contact between the rivet or stud and the lead port can be seriously degraded or lost, thus making the cell unusable. For high-current applications, the dissimilar metals contact creates an area which is susceptible to heating due to contact resistance. This can result in weakening of the seal area and also promotes oxidation of the contact surfaces which can further increase the contact resistance.

The terminal seal taught by U.S. Pat. No. 4,859,547 overcomes some of the aforementioned problems. This particular design permits the use of all lead parts and a terminal configuration without sacrificing seal performance, manufacturing ease or manufacturing costs. Under the design of this particular U.S. Patent, the plastic seal area is molded into the battery lid. However, under vibrational loads and/or high external mechanical stresses, the seal can nonetheless be damaged. Damage can also result to the terminal seal when the battery lid moves relative to the battery elements and the battery case or when the outer terminal moves relative to the sealing components in the battery lid. Thus, there still remains a need for a battery terminal design which provides long-term sealing capability against leakage despite mechanical loading on the battery and which overcomes the other aforementioned problems.

SUMMARY OF THE INVENTION

Accordingly, it is one object of the present invention to provide an improved terminal connector structure for electrochemical batteries.

It is another object of the present invention to provide a terminal structure for electrochemical devices which provide sealing capability against electrolyte leakage even under high mechanical load stress conditions.

It is yet another object of the present invention to provide an improved electrochemical battery design having enlarged handle portions for carrying the battery.

Still another object of the present invention is to provide an improved terminal connector design for batteries wherein the sealing mechanism which prevents electrolyte leakage is remote from the external terminal member of the battery.

To achieve the foregoing and other objects and in accordance with a purpose of the present invention as embodied and broadly described herein, a terminal connector assembly is disclosed. The terminal connector assembly conducts electric current from an electrolytic device through the wall of a case containing the device while preventing leakage of the electrolyte from the case. The terminal connector assembly includes a terminal insert mounted within the case wall. The insert includes a first end portion which projects through the wall and forms an exterior connection member, and a second end portion laterally spaced from the first end portion within the case and which forms an interior connection member remote from the exterior connection member. A mechanism is provided for substantially reducing the transmittal of mechanical loads from the first end portion to the second end portion. Moreover, a member electrically interconnects the interior connection member with the electrolytic device within the case. Finally, a mechanism is provide for sealing the connection between the electrically interconnecting member and the interior connection member to prevent leakage of electrolyte from the device.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings together with the description illustrate complete preferred embodiments and serve to explain the principles of the invention according to the best modes presently devised for the practical application of the principles thereof, and in which.

DETAILED DESCRIPTION OF THE PREFERRED EMBODIMENTS

Figure 1:
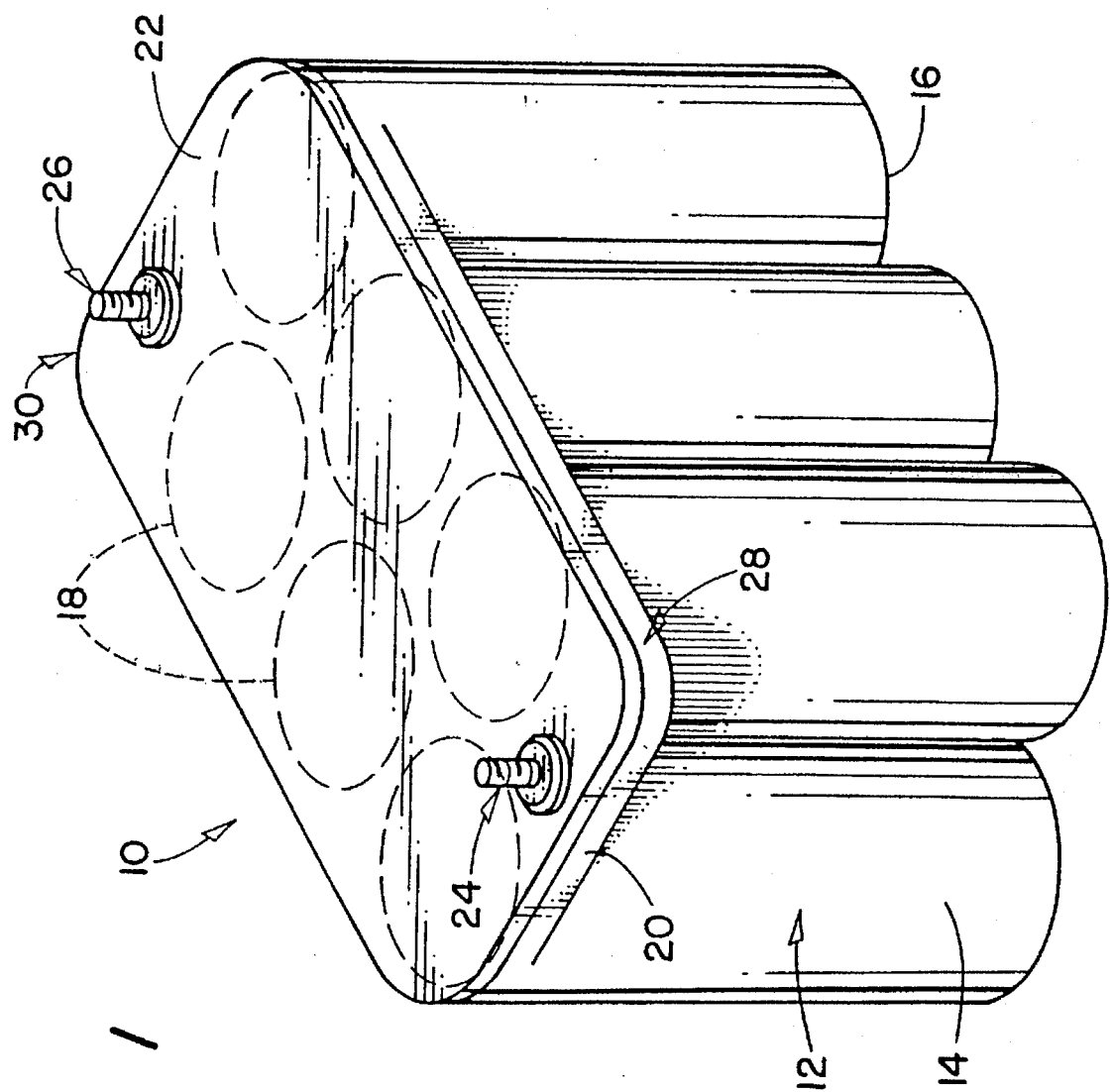
FIG. 1 is front perspective view of a battery constructed in accordance with the present invention.

Referring first to FIG. 1, an electrochemical device or battery 10 is illustrated and includes a case 12 having body side portions 14 and a bottom portion 16 integrally molded together. Preferably, the case 12 is made from an electrically nonconductive, resilient material such as plastic and the like. In one preferred form, polypropylene is utilized to form case 12, with the cell walls of case 12 are approximately ⅛th inch thick. The body 14 is divided into a plurality of chambers 18, six being illustrated, which are sized and shaped to receive individual electrochemical cells as is known in the art, and described below and, for example in U.S. Pat. No. 4,780,379. An upper flange member 20 is a substantially rectangular in shape is integral with, and forms the upper portion of case 12. A cover 22 is also substantially rectangular in shape and is sized and shaped to fit over flange 20 and provide a cover for battery 10. Terminal connectors 24, 26 are provided at each end of battery 10 and are configured to accept connection to a user's battery cables. In addition, flange 20 provides two ledge portions 28, 30 at either end of battery 10 proximate terminal connectors 24, 26. The ledges 28, 30 function as handles in order to lift and grasp battery 10 in easy fashion.

Figure 2:
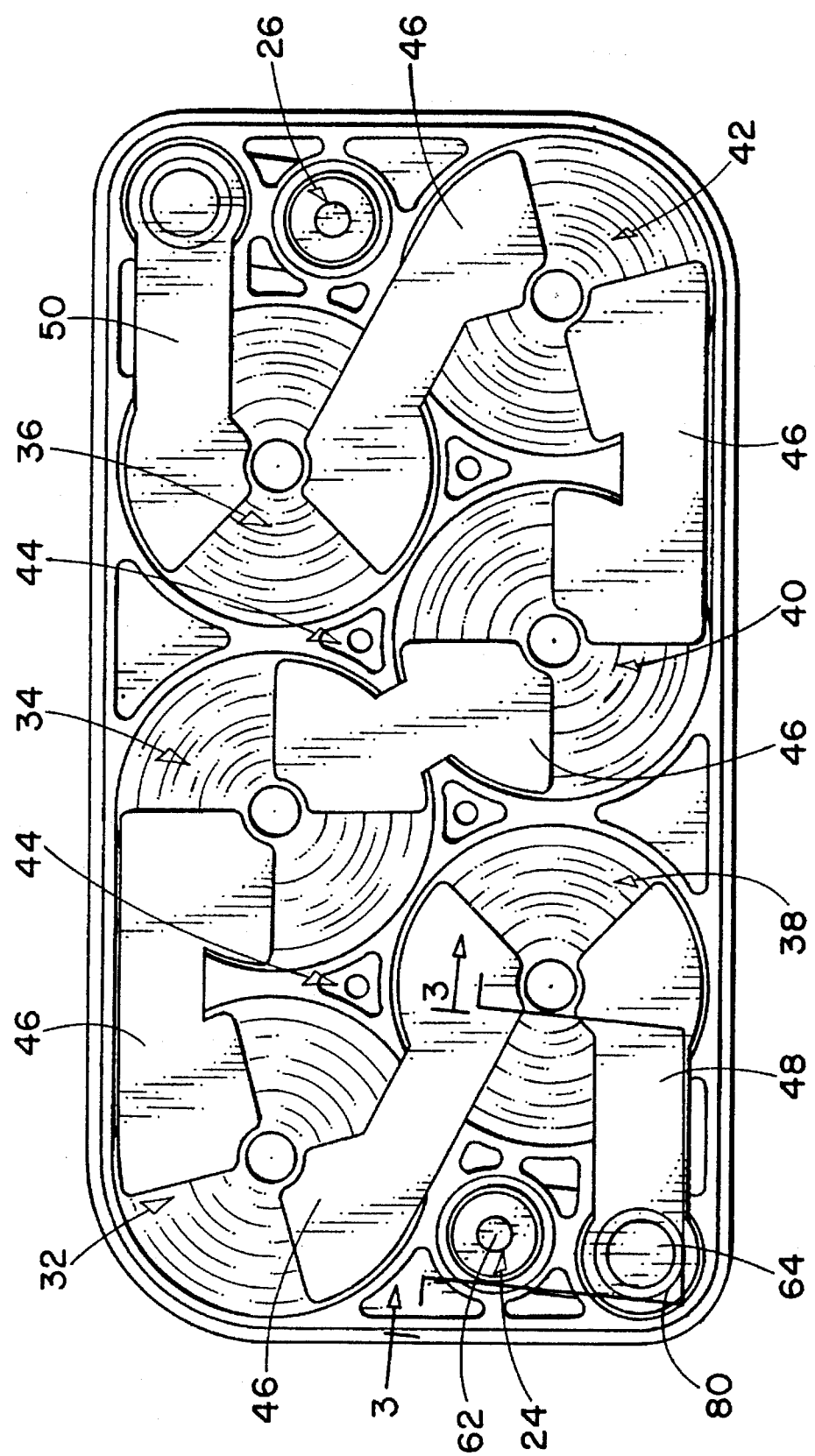
FIG. 2 is top plan view of the battery of FIG. 1 with the cover member removed therefrom.
Figure 3:
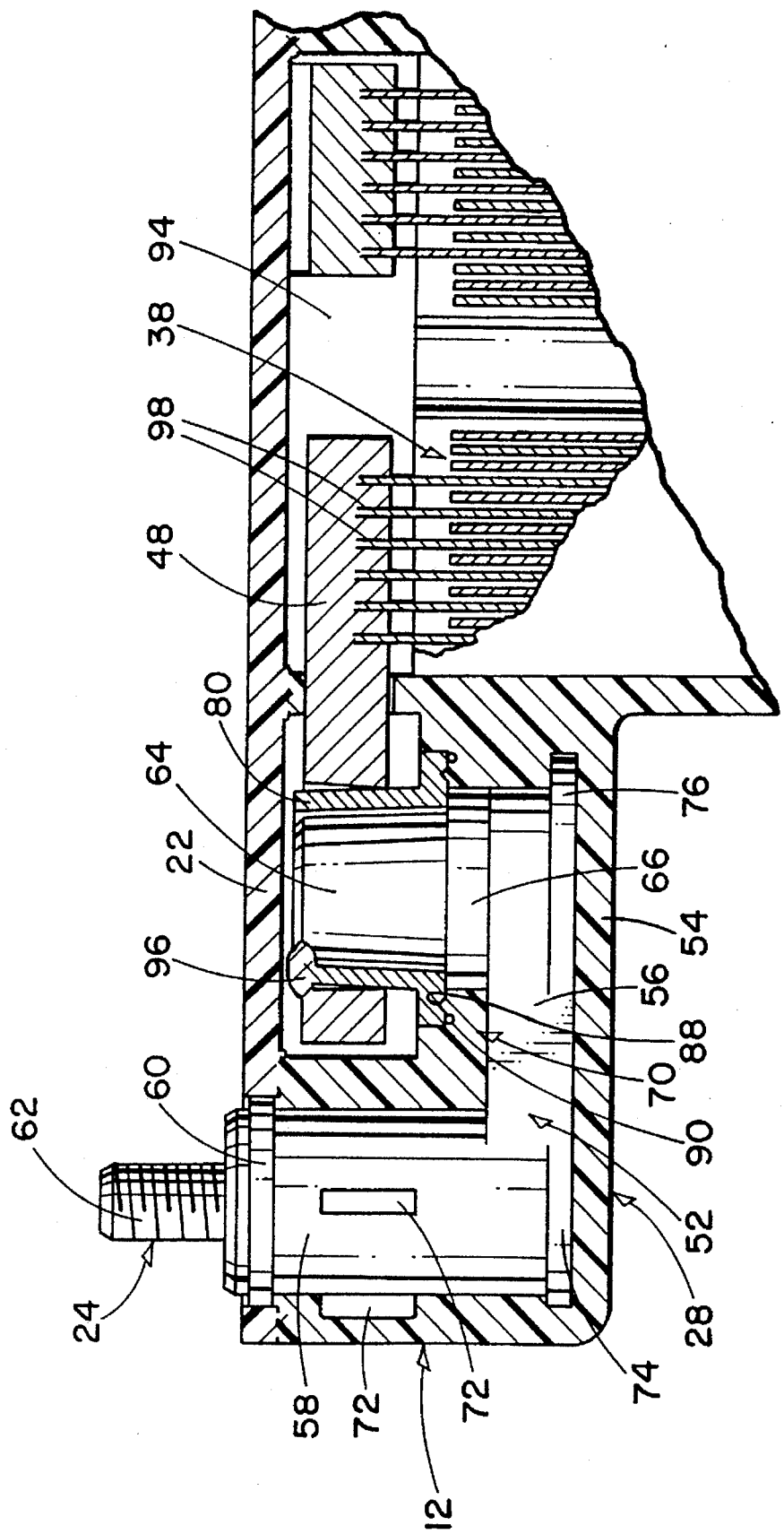
FIG. 3 is a partial sectional view taken generally along line 3—3 of FIG. 2.
Figure 4:
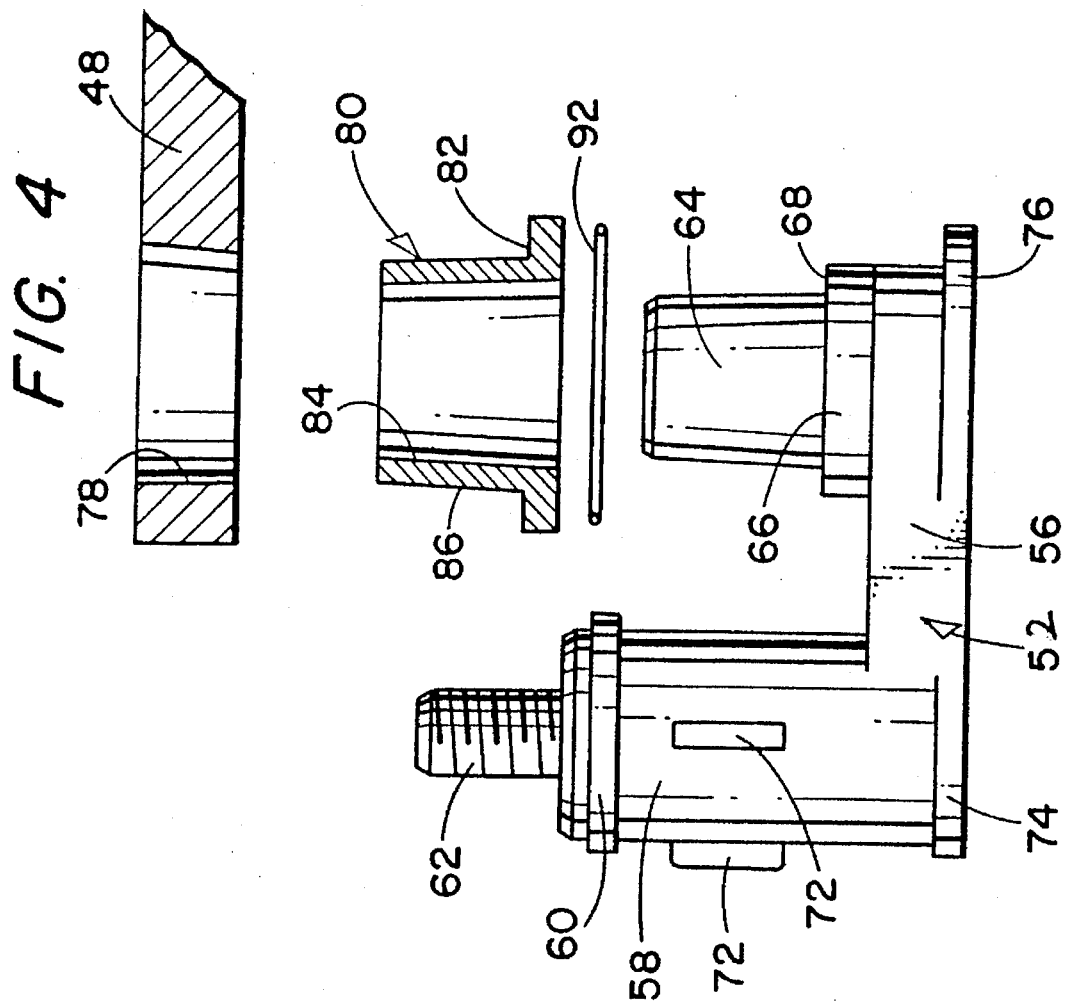
FIG. 4 is an exploded view of the components of a terminal insert member constructed in accordance with the present invention.

Referring now with more particularity to FIGS. 2–4, a plurality of individual electrochemical cells or elements 32, 34, 36, 38, 40 and 42 are disposed within chambers 18 of battery 10. As shown, elements 32, 34, 36, 38, 40 and 42 are shown to be, and are preferably cylindrical in form and are deposited within cylindrical chambers 18 (FIG. 1). The cylindrical cells provide for tight compression which results in improved cell life. In one preferred form, the electrochemical elements or cells 32, 34, 36, 38, 40 and 42 are arranged in two substantially parallel rows with cells, 32, 34 and 36 in one row, and cells 38, 40 and 42 in a second adjacent row. As can be seen from FIGS. 1 and 2, the first row of cells 32–36 are aligned in an offset fashion relative to the second row of cells 38–42 so that the cells 38–42 nest in the areas 44 between cells 32, 34 and 36. In this manner, cells 32, 34, 36, 38, 40 and 42 are positioned in closer proximity to each other as compared to prior art cells wherein the rows of cells are aligned immediately next to each other in mirror image. In addition, the design of the present invention enables more electrolyte and active material a to be placed within the same case volume and reduces empty space between the cells and the battery cover, thus providing a more effective use of space. Finally, this offset arrangement of cells 32, 34, 36, 38, 40 and 42 also enables the creation of ledges 28 and 30 which serve a dual function, as described below.

The cells 32, 34, 36, 38, 40 and 42 are interconnected in electrical series by electrically conducting strap members 46. Moreover, terminals 24, 26 are electrically interconnected to cells 32, 34, 36, 38, 40 and 42 by end-straps 48 and 50. The construction of straps 46, 48 and 50 and elements 32, 34, 36, 38, 40 and 42 are well known in the art and disclosed in the U.S. Pat. No. 4,859,547 and U.S. Pat. No. 4,780,379, the contents of which are hereby incorporated by reference, as though set forth in their entirety, and details with respect to their construction and function will not be repeated herein.

The terminal connector design of the present invention will be described with respect to terminal connector 24 and ledge 28. However, it should be noted that the terminal connector 26 and ledge 30 are essentially mirror images of external connector 24 and ledge 28 and are thus formed and function in a similar manner. Moreover, while the preferred embodiment of the terminal connector 24 is described in detail below, any terminal configuration may be utilized wherein the interior connection is laterally spaced from the exterior connection in accordance with the present invention.

Referring to FIGS. 3 and 4, in one preferred form, terminal connector 24 includes an insert member 52 which is mounted in and preferably molded into casing wall 54 of ledge portion 28. The insert member 52 includes an elongated body portion 56 having a first end portion in the form of a terminal post 58. The terminal post 58 projects angularly from body 56 and preferably at right angles to body 56. The terminal post 58 preferably includes an upper collar 60 which provides a shoulder for engagement with cover 22. A terminal stud 62 projects axially outwardly from the end of post 58 to form an exterior terminal connector member 24.

Disposed at the opposite end of body member 56 is a second end portion preferably a in the form of a pin 64 which also projects angularly upwardly and preferably at right angles a from body 56, and substantially parallel to post 58. In preferred form, pin 64 includes an annular collar 66 located at the base thereof proximate body member 56 to form a shoulder 68. As shown in FIG. 4, body member 56 and collar 66 are embedded within case wall 54 similar to post 58. However, pin 64, projects outwardly into the center of case 12 and is exposed to the interior space 94 of battery 10. The case wall 54 is sized and shaped so as to form an annular portion 70 immediately surrounding collar 66.

The above arrangement for insert 52 permits the exterior terminal connection member 62 to be remotely located within the ledge 28 relative to the interior connection member which is in the form of pin 64, as clearly illustrated in FIGS. 2 and 3. This spacing between the external terminal connection member 62 and the interior connection member 64, which in turn is connected directly to cell 38 by way of end strap 48, reduces the transmission of any mechanical loads which may be imposed on external connector member 62 to internal connection 64. Thus, torque loads imposed on external connection member 62 as well as loads imposed by outward pulling are resisted by case wall 54 and are not transmitted to the internal connection member 64. In order to further assist in the reduction of transmission of mechanical loads, a plurality of ribs or tabs 72 are preferably provided along exterior surface of post 58. The tabs 72 enhance the surface area engagement between case wall 54 and post 58 to assist in enabling cell wall 54 to carry rotational or torque loads imposed on exterior connector member 62. Likewise, foot portions 74, 76 are provided at the base of post 54 and pin 64, respectively. The foot portions 74, 76 are in the form of flanges which extend laterally outwardly from body member 56 so as to provide additional surface area engagement with case wall 54. These foot portions 74, 76 likewise enhance the feature of mechanical loads being resisted and carried by case wall 54 rather than being transmitted to interior connection member 64.

In order to interconnect pin 64 to electrochemical cells 32, 34, 36, 38, 40 and 42, which are connected in series as previously described, end strap 48 includes an aperture 78 which is adapted to receive pin 64. In order to ensure that terminal connector 24 is sealed to prevent the leakage of gas or electrolyte from the case 12, a ferrule or bushing 80 is provided having a collar or flange portion 82, as shown in FIG. 4. The ferrule 80 is sized and shaped so that its internal opening 84 will receive pin 64 therein. The aperture 78 in end strap 48 is sized and shaped to receive exterior surface 86 of ferrule 80. The pin 64 and the ferrule 80 are tapered in form so that as end strap 48 is forced down about outer surface 86 of ferrule 80 which in turn is seated around pin 64, ferrule 80 is compressed tightly between the pin 64 and the end strap 48 so as to have a fluid tight press fit relationship between the three components. To this end, ferrule 80 is preferably constructed from lead so as to provide excellent electrical conductance while also being pliable. Due to the arrangement of insert member 52, end strap 48 is significantly higher, say about one inch, than body portion 56. This permits sealing ferrule 80 to be embedded in battery 10. In addition, this construction prevents extra space between cover 22 and the top of cells 32, 34, 36, 38, 40 and 42 as compared to the existing design as illustrated in U.S. Pat. No. 4,780,379. This arrangement reduces the volume available to collect hydrogen gases and thus reduces the danger of explosion.

Referring in particular to FIG. 3, annular member 70 surrounding collar 66 at the base of pin 64 includes an annular upraised portion 88 in the form of a sealing ring. The sealing ring 88 functions to engage and press into the bottom surface of the collar 82 of ferrule 80 as the ferrule 80 is pressed down about pin 64. In addition, annular portion 70 further includes an annular groove 90 into which a resilient O-ring 92 is placed. The combination of O-ring 92 and sealing ring 88 which engage collar 82 of ferrule 80 ensure against seepage of gas or electrolyte fluids from within interior 94 of battery 10 past the internal electrical connection.

Since good wear resistance and hardness are highly desired characteristics of the terminal, it is preferred that exterior terminal member 62 be constructed from a lead alloy which is much harder than pure lead. One preferred alloy is antimony (2%–8%)/lead alloy or an antimony/tin/lead alloy. Other alloy combination well known to the art may also be used. As previously indicated, it is preferred that the sealing ferrule 80 be constructed from pure lead. The end strap 48 is preferably also a lead alloy so as to provide a harder material as compared to sealing ferrule 80. To complete the construction of the interior connection with end strap 48, a fusion weld 96 is completed between pin 64, sealing ferrule 80 and end strap 48. This burn or fusion weld 96 ensures sound and firm mechanical attachment and electrical contact between these three components.

To assemble the battery arrangement of the present invention, the preferably cylindrical battery elements 32, 34, 36, 38, 40 and 42, constructed in accordance with known technology, are placed into the appropriate cavities 18 in battery case 12 and partially pressed into place. As previously discussed, cavities 18 are arranged in two rows in offset fashion. The battery cell interconnection straps 46 are then cast onto cell tabs 98 along with end straps 48, 50, which are configured to fit over the interior terminal end pin 64 and sealing ferrule 80. The cells 32, 34, 36, 38, 40 and 42 with these straps 46 are then fully pressed into case 12, and end straps 48, 50 are then pressed over terminal pin 64 and sealing ferrule 80 of terminals 24 and 26. The end strap, terminal pin and sealing ferrule are then all burned together to form a good electrical path through the fusion weld 96. At the appropriate time in the assembly sequence, battery lid or cover 22 is joined to the battery case 12, thus completely sealing the battery from the external environment.

The offset arrangement of battery cells 32, 34, 36, 38, 40 and 42 allow for the creation of ledges 28 and 30, and permit insert member 56 to be integrally molded within case wall 54 at ledge 28 while providing the spaced apart relationship between the external battery connector 62 and the internal connecting member 64. As previously discussed, this spaced apart relationship as well as other features of inset member 52 provide the significant advantage of the present invention by reducing the transmittal of mechanical loads to the sealing area of the internal connecting member. In this manner, the seal is less likely to be broken as in prior designs since it is not exposed to the mechanical stresses that have caused failure of prior art sealing designs.

As can be seen from the above, the present invention provides several significant advantages over the prior art. The present invention provides a battery design which, due to its offset sequencing of cells, permits more electrolyte and active material to be placed within the same volume as compared to prior art designs. This enhances the life and power of the battery. Moreover, the present invention also provides handles at each end of the battery of significant size to permit full grasping of the battery with the user's hands rather than fingertip control as is the case of many prior art battery designs. Inasmuch as these batteries tend to be quite heavy, prior art designs permitting only fingertip lifting of the batteries created inconvenience and safety concerns. The present invention overcomes these problems by providing substantial, full hand-hold members to pick up and carry the battery of the present invention. Moreover, the present invention provides a terminal connector arrangement whereby mechanical loads imposed on the external terminal connectors are not transmitted to the internal connection area which carries the seal which in turn prevents the leakage of electrolyte and gas from the interior of the battery. By preventing the transfer or transmittal of mechanical loads to the seal area, the present invention substantially a reduces the likelihood of such seals being broken over time due to vibration or handling of the battery. Thus, the present invention provides for longer life due to less likelihood of electrolyte seepage.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art.

We claim:

1. A terminal connector assembly for conducting electrical current from an electrolytic device through the wall of a case containing said device while preventing leakage of electrolyte from said case, said terminal connector comprising:

a terminal insert mounted within said case wall and including a first end portion projecting through said wall and forming an exterior connection member, a second end portion laterally spaced from said first end portion within said case to form an interior connection member remote from said exterior connection member, and means for substantially reducing the transmittal of mechanical loads from said first end portion to said second end portion;

means for electrically interconnecting said interior connection member with said electrolytic device within said case;

means located between said electrically interconnecting means and said interior connection member for sealing the connection between said electrically interconnecting means and said interior connection member to prevent leakage of electrolyte from said case, wherein said load reducing means comprises an insert body portion disposed between said first and second end portions and spacing said interior connection member away from said exterior connection member to substantially transfer any mechanical loads imposed on said exterior connection member to said case wall; and wherein said interior connection member comprises a pin projecting angularly outwardly from said insert body portion.

2. The terminal connector assembly as claimed in claim 1, wherein said case is constructed from electrically nonconducting, resilient material, and wherein said insert is integrally molded into said case wall.

3. The terminal connector assembly as claimed in claim 2, wherein said case includes a body portion for containing said electrolytic device and a ledge portion projecting laterally outwardly from said body portion to contain said terminal insert.

4. The terminal connector as claimed in claim 1 wherein said first end portion includes a post projecting angularly from one end of said insert body portion, said post including said exterior connection member projecting therefrom.

5. The terminal connector assembly as claimed in claim 4, wherein said load reducing means further includes a plurality of ribs projecting radially outwardly from said post for enhancing the surface area engagement between said first end portion and said case wall.

6. The terminal connector assembly as claimed in claim 4, wherein said load reducing means further includes a foot member disposed at the base of each said first and second end portions to enhance the surface area engagement between said insert and said case wall.

7. The terminal connector assembly as claimed in claim 1, wherein said electrically interconnecting means comprises an electrically conductive strap having an aperture adapted to receive said interior connection member.

8. The terminal connector assembly as claimed in claim 7, wherein said sealing means comprises a ferrule sized and shaped to slip fit onto said pin and force the aperture of fit within said electrically conductive strap.

9. The terminal connector assembly as claimed in claim 8, wherein said ferrule includes a base collar portion, wherein said sealing means further includes an annular ridge surrounding the base of said pin and adapted to penetrate the base collar portion of said ferrule, and wherein an O-ring surrounds the base of said pin and is adapted for engagement with the base collar portion of said ferrule.

10. The terminal connector assembly as claimed in claim 8, wherein said sealing means further includes a fusion weld disposed at the intersection of said electrically conductive strap, said pin and said ferrule.

11. A terminal insert for mounting within the case wall of a battery to provide electrical current from current generating members within said case to the exterior of said case without loss of electrolyte or gas from said case, said insert comprising:

an elongated body member having oppositely disposed end portions;

a first body end portion projecting angularly outwardly from said body member and including an exterior battery terminal stud;

a second body end portion projecting outwardly from said body member in the form of an interior terminal connector member;

means for substantially reducing the transmittal of mechanical loads from said exterior battery terminal stud to said interior terminal connector member;

means for effecting sealing of said interior terminal connector member within said battery case to prevent leakage of fluid from said case; and wherein said interior terminal connector member comprises a pin projecting substantially perpendicularly to the longitudinal axis of said elongated body member.

12. The terminal insert as claimed in claim 11, wherein said first body end portion comprises a post member projecting substantially perpendicularly to the longitudinal axis of said elongated body member, said exterior battery terminal stud projecting axially from the distal end of said post member.

13. The terminal insert as claimed in claim 12, wherein said lead reducing means comprises a plurality of tabs projecting radially outwardly from the surface of said post member.

14. The terminal insert as claimed in claim 12, wherein said lead reducing means comprises a pair of foot portions disposed at the base of said first and second body end portions forming shelves adapted for engagement with a battery case wall.

15. The terminal insert as claimed in claim 11, wherein said pin includes an annular base collar forming an annular shoulder about said pin proximate the juncture of said pin and said body member.

16. The terminal insert as claimed in claim 15, wherein said sealing means comprises a ferrule sized and shaped to fit about said pin, said ferrule including a base flange sized and shaped to abut the annular shoulder surrounding said pin.

17. A sealed electrochemical device having a plurality of electrochemical cells, said device comprising:

a case for containing said cells and a cover adapted for sealing engage therewith;

a pair of terminal members mounted in said case and projecting through said case and cover, each said terminal member including a first end portion projecting through said case and cover and forming an external connection member, and a second end portion spaced laterally from said first end portion within said case and adapted to form an interior connection member within said case for electrical connection to said cells;

means for electrically connecting said cells in series and for electrically interconnecting said interior connection members to said cells within said case; and means for sealing said interior connection members to said case to prevent leakage from said case;

wherein each said terminal member includes means for substantially reducing the transmittal of mechanical loads from said external battery connection member to said interior connection member;

wherein said load reducing means comprises an insert body portion interconnecting said external connection member and said interior connection member in spaced-apart relation; and wherein said interior connection member comprises a pin protecting angularly outwardly from said insert body member toward said cover.

18. The device as claimed in claim 17, wherein said case includes a pair of ledge portions extending laterally outwardly at opposite ends thereof, said terminal members being mounted within said case ledge portions.

19. The device as claimed in claim 18, wherein said case is constructed from resilient, nonconductive material, and said terminal members are integrally molded therein.

20. The device as claimed in claim 18, wherein said ledge portions comprise handles to carry said device.

21. The device as claimed in claim 19, wherein said first end portion comprises a post projecting angularly from one end of said insert body member and encased within said ledge portion, a terminal stud projecting outwardly from said post through said cover to form said external battery connection member, and a plurality of rib members projecting radially outwardly from the outer surface of said post to provide greater surface area for molding contact between said first end portion and said resilient case.

22. The device of claim 19 wherein said load reducing means further comprises a foot member extending laterally outwardly from the base of each said first and second end portions, of said terminal member to enhance the surface contact between said terminal member and said resilient case.

23. The device as claimed in claim 19 wherein said interior connection member comprises a collar surrounding the base of said pin forming an annular shoulder about the base area of said pin.

24. The device as claimed in claim 23, wherein said pin collar is surrounded by said resilient casing material in the form of a ring having a shoulder portion, said casing shoulder portion including an annular groove adapted to receive an O-ring, and an annular ridge projecting outwardly from said casing shoulder portion.

25. The device as claimed in claim 24, wherein said sealing means includes a ferrule adapted for form fitting about said pin against said annular shoulder, said ferrule including an annular base flange adapted for engagement with said annular ridge and said O-ring.

26. The device as claimed in claim 25, wherein said cell connecting means comprises a plurality of electrically conducting straps interconnecting said cells to each other in series and a pair of end straps electrically connecting said cells to said interior connection members, each said electrically conducting end strap including an aperture proximate the terminal end thereof adapted to receive said pin and said ferrule.

27. The device as claimed in claim 21, wherein said sealing means further comprises a fusion weld interconnecting said terminal strap, said ferrule and said pin.

28. A terminal insert for mounting within the case wall of a battery to provide electrical current from current generating members within said case to the exterior of said case without loss of electrolyte or gas from said case, said insert comprising:

an elongated body member having oppositely disposed end portions;

a first body end portion projecting angularly outwardly from said body member and including an exterior battery terminal stud;

a second body end portion projecting outwardly from said body member in the form of an interior terminal connector member;

wherein said interior terminal connector member is sealed within said battery case; and wherein said interior terminal connector member comprises a pin projecting substantially perpendicularly to the longitudinal axis of said elongated body member.

29. The terminal insert as in claim 28, wherein said first body end portion comprises a post member projecting substantially perpendicularly to the longitudinal axis of said elongated body member, said exterior battery terminal stud projecting axially from the distal end of said post member.

30. The terminal insert as claimed in claim 29 wherein a plurality of tabs project radially outwardly from the surface of said post member.

31. The terminal insert as claimed in claim 29 wherein a pair of foot portions disposed at the base of said first and second body end portions form shelves adapted for engagement with a battery case wall.

32. The terminal insert as claimed in claim 28 wherein said pin includes an annular base collar forming an annular shoulder about said pin proximate the juncture of said pin and said body member.

33. The terminal insert as claimed in claim 32, further comprising a ferrule sized and shaped to fit about said pin, said ferrule including a base flange sized and shaped to abut the annular shoulder surrounding said pin.

34. The terminal insert as claimed in claim 28, wherein said interior terminal connector member is sealed within said battery case to prevent leakage of fluid from said case.

* * * * *

UNITED STATES PATENT AND TRADEMARK OFFICE
CERTIFICATE OF CORRECTION

PATENT NO. : 5,599,641
DATED : February 4, 1997
INVENTOR(S) : Ching, Jr. et al.

It is certified that error appears in the above-indentified patent and that said Letters Patent is hereby corrected as shown below:

In column 3, line 42, after "is" delete --a--.

In column 4, line 6, after "rial" delete --a--.

In column 4, line 47, after "preferably" delete --a--.

In column 6, line 59, after "substantially" delete --a--.

In column 7, line 27, change "case," to --case;--.

In column 8, line 41, change "lead" to --load--.

In column 8, line 45, change "lead" to --load--.

Signed and Sealed this

Thirteenth Day of May, 1997

Attest:

Attesting Officer

BRUCE LEHMAN
Commissioner of Patents and Trademarks